March 26, 1935. C. H. WILLIS ET AL 1,995,876
METHOD OF AND APPARATUS FOR STARTING AND OPERATING ELECTRIC MOTORS
Filed March 12, 1932
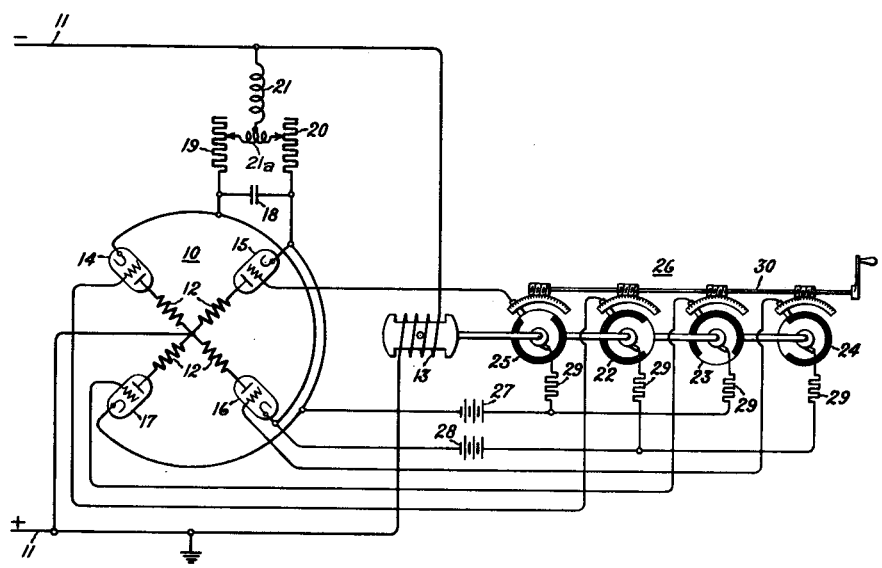
Inventors:
Clodius H. Willis,
Philip M. Currier,
by Charles V. ?
Their Attorney.

Patented Mar. 26, 1935

1,995,876

UNITED STATES PATENT OFFICE 1,995,876

METHOD OF AND APPARATUS FOR STARTING AND OPERATING ELECTRIC MOTORS

Clodius H. Willis, Princeton, N. J., and Philip M. Currier, Ballston Lake, N. Y., assignors to General Electric Company, a corporation of New York Application March 12, 1932, Serial No. 598,519

9 Claims. (Cl. 171—228)

Our invention relates to a method of and apparatus for starting and operating electric motors, and, while it is of general application, it is particularly useful for starting and operating alternating current motors of the synchronous type energized from a source of direct current through a plurality of electric valves.

Heretofore there have been proposed numerous arrangements including electric valves for operating electric motors from a direct current circuit, the electric valves operating in the manner of a conventional commutator, but greatly reducing the number of armature sections or phase windings required. The use of electric valves of the vapor electric discharge type in such arrangements has been found particularly advantageous because of the relatively large amounts of power which may be handled with exceedingly low losses in the valves. However, it has not heretofore been possible to start from a source of direct current an electric motor commutated by means of electric valves of the vapor electric discharge type, because of the inability of the grids of this type of valve to interrupt a unidirectional current through them. The term "direct current" as used here and throughout the specification refers to a unidirectional current which is practically non-pulsating in nature. The term "direct current" as used herein conforms to the definition given in the 1933, 6th Edition of the Standard Handbook for Electrical Engineers, Sec. 2811.

It is an object of our invention, therefore, to provide an improved method of and apparatus for starting and operating an electric motor energized from a source of direct current through a plurality of electric valves which will overcome the above mentioned disadvantages of the arrangements of the prior art and which will be simple and reliable in operation.

It is another object of our invention to provide an improved method of and apparatus for starting and operating an alternating current motor of the synchronous type energized from a source of direct current through a plurality of electric valves.

It is a further object of our invention to provide an improved method of and apparatus for operating an electric motor from a source of direct current through a plurality of electric valves in which the current is commutated between the several electric valves under low speed conditions by means of an auxiliary potential and in which the current is commutated between the several electric valves under normal running conditions by means of the exciting winding of the motor.

In accordance with one embodiment of our invention there is provided an electric motor having an armature winding provided with a plurality of sections or phase windings, and each of these phase windings is connected to a direct current circuit through an electric valve. The other side of the direct current circuit may be similarly connected with the several phase windings through oppositely connected electric valves, or in case it is desired that the motor shall operate half wave, the other side of the direct current circuit is connected to the electrical neutral of the armature winding. The several electric valves associated with alternate phase windings are connected together and a commutating capacitor is connected between the two groups of valves. Each terminal of the capacitor is connected to one side of the direct current circuit through a variable impedance. The exciting winding of the motor may be connected either in parallel or in series, depending upon the speed-torque characteristics desired. The several electric valves are controlled by a commutator driven by the motor rotor, the adjustment being such that only the particular phase, or phases, of the motor winding which are in a position to produce torque conduct current at any particular instant. Under starting conditions, the potential across the capacitor is effective to commutate the current between successive electric valves. As the motor comes up to speed, the variable impedances are cut out, thus increasing the motor voltage, and the exciting winding induces an electromotive force in the armature winding which is effective to commutate the current between the several electric valves.

For a better understanding of our invention, together with other and further objects thereof reference is had to the following description taken in connection with the accompanying drawing, and its scope will be pointed out in the appended claims. The single figure of the accompanying drawing illustrates an arrangement for operating a four phase, half wave motor of the synchronous type from a source of direct current.

Referring now to the drawing, there is illustrated an arrangement for operating a four phase, half wave motor 10 of the synchronous type from a direct current supply circuit 11. The motor 10 comprises a four phase star connected armature winding 12, and a field winding 13, illustrated as the motor rotor, although it will be obvious to those skilled in the art that either the armature or field winding may be made the rotor. The field winding 13 may be connected across the direct current circuit 11, as illustrated, or, in case it is desired to give the motor series rather than shunt characteristics, the field winding 13 may be connected in series with the armature winding 12. The several phases of the armature winding 12 are connected to electric valves 14, 15, 16 and 17, each provided with an anode, a cathode and a control grid. These valves may be of any of the several types well known in the art, although we prefer to use valves of the vapor electric discharge type. As illustrated, the anodes of the several valves are connected to the terminals of the armature winding 12, and the cathodes of the valves associated with alternate phase windings are connected together. Between the common connections of the two groups of valves there is connected a commutating capacitor 18 and each terminal of this capacitor is connected to one side of the direct current circuit through variable resistors 19 and 20. If desired, a smoothing reactor 21 may be included in the common connection between the variable resistors and the direct current circuit and an auxiliary mid-tapped reactor may be included between the reactor 21 and the resistors 19 and 20 to aid in the commutation under certain operating conditions. The grids of the several electric valves 14-17, inclusive, are adapted to be excited through the several elements 22-25, inclusive, respectively, of a distributor 26 driven directly from the motor shaft, as indicated. The grid potentials are derived from the positive bias batteries 27 and 28 included in the common cathode connections of the several electric valves, as indicated, and if desired, current limiting resistors 29 are included in each of the grid circuits. In case the several electric valves have a negative grid characteristic, separate negative bias batteries may be included in the several grid circuits, as is well understood by those skilled in the art. In order to control the speed-torque characteristics of the motor, there is provided a brush shifting arrangement 30 for the distributor 26, which functions in a manner similar to that of a brush shifting arrangement in a direct current shunt motor.

In explaining the operation of the above described apparatus, it will be assumed that the motor rotor is in the position indicated in the drawing, and that the direction of rotation is counter-clockwise. Under these conditions, it is seen that a positive bias is impressed upon the grid of electric valve 15 from the battery 27 through the distributor section 25. Current now flows from the positive direct current terminal to the neutral of the armature winding 12, the phase winding connected to the electric valve 15, the electric valve 15, variable resistor 20, reactor 21, to the other side of the direct current circuit. It will be noted that the rotor is in such position as to receive a torque from the energized phase winding so that the motor will begin to rotate. After a rotation of substantially 90 mechanical degrees, it is seen that the grid of electric valve 14 will be energized through the distributor section 22, and the positive bias will be removed from the grid of the valve 15. During the interval required for the motor to move through the 90 mechanical degrees, the capacitor 18 becomes charged to the potential drop across the resistor 20, and, when electric valve 14 is made conductive, it is seen that the potential of this capacitor is of the proper polarity to commutate the current from the valve 15 to the valve 14. In this manner the current is successively commutated between the several electric valves, the particular valves and phase windings which are energized being dependent entirely upon the mechanical position of the rotor and so determined that only that phase winding is energized which is in the proper position relative to that of the rotor to produce a mechanical torque. It is seen that the variable resistors 19 and 20, together with the capacitor 18 serve the dual function of providing an electromotive force for commutating the current between the several electric valves and a starting resistance to reduce the applied potential on the motor until it can come up to speed and generate a counter-electromotive force. As the motor comes up to speed, the resistors 19 and 20 are gradually cut out, which it is seen, tends to reduce correspondingly the commutating potential produced by the capacitor 18. However, as the motor comes up to speed, the electromotive force induced in the several phase windings of the armature 12 by the field winding 13 is effective to commutate the current between the several electric valves, provided only that the distributor mechanism is so adjusted that the counter-electromotive force of the phase winding associated with the incoming valve is less than that associated with the outgoing valve at the instants of commutation. With such an arrangement the auxiliary commutating reactor 21a may be omitted. When our invention is applied to an induction motor, or any motor not provided with a field winding, however, the commutating capacitor 18 is required not only for starting, but also under normal operating conditions. In such an application, when the starting resistances are cut out, the commutating reactor 21a acts as a series auto-transformer, alternately charging the condenser 18 to opposite polarities in accordance with the magnitude of the load current, as will be well understood by those skilled in the art. This feature is broadly claimed and described in more detail in United States Letters Patent No. 1,929,-722, granted October 10, 1933, upon an application of Clodius H. Willis, and assigned to the same assignee as the present application.

While we have described our invention as applied to a four-phase, half wave motor, it will be obvious to those skilled in the art that it is equally applicable to a motor of any number of phases, and to a full wave motor circuit, in which case the commutating apparatus associated with the illustrated valves will be duplicated for the oppositely connected valves interposed between the armature winding 12 and the other side of the direct current circuit.

While we have described what we at present consider the preferred embodiment of our invention, it will be obvious to those skilled in the art that various changes and modifications may be made without departing from our invention, and we therefore aim in the appended claims to cover all such changes and modifications as fall within the true spirit and scope of our invention.

What we claim as new and desire to secure by Letters Patent of the United States is:

1. An arrangement for starting an electric motor provided with a plurality of phase windings from a source of direct current, comprising an electric valve for connection with each phase of said motor, a commutating capacitor, each terminal of said capacitor being connected to the valves associated with alternate phases of said motor, and a variable impedance connected between each terminal of said capacitor and having a common terminal for connection to said source of direct current.

2. An arrangement for starting an electric motor provided with a plurality of phase windings from a source of direct current, comprising an electric valve for connection to each of said phase windings, a pair of circuits interconnecting alternate electric valves, a commutating capacitor connected between said circuits, a variable resistor connected to each circuit and having a common terminal for connection to said source of direct current, and means for simultaneously varying the resistance of said resistors.

3. In combination, a dynamo-electric machine provided with a plurality of phase windings, a source of direct current, and means for energizing said machine from said source comprising an electric valve associated with each phase of said machine, a commutating capacitor, each terminal of said capacitor being connected to the valves associated with alternate phases of said machine, and a variable impedance connected between each terminal of said capacitor and said source of direct current.

4. In combination, an electric motor provided with a plurality of phase windings, a source of direct current, means for energizing said motor from said source including an electric valve connected with each of said phase windings, means for commutating the current between said valves under starting conditions comprising a capacitor, each terminal of said capacitor being connected to the valves associated with alternate phases of said motor, and a variable impedance connected between each terminal of said capacitor and said direct current circuit, and an exciting winding for said motor for commutating the current between said valves under normal running conditions.

5. In combination, an electric motor provided with a plurality of phase windings, a source of direct current, means for energizing said motor from said source including an electric valve connected with each of said phase windings, means for commutating the current between said valves under starting conditions comprising a capacitor, each terminal of said capacitor being connected to the valves associated with alternate phases of said motor, and a variable resistor connected between each terminal of said capacitor and said direct current circuit, an exciting winding for said motor for commutating the current between said valves under normal running conditions, and a distributor driven by the motor rotor for sequentially rendering said valves conductive in accordance with the mechanical position of the motor rotor.

6. In combination an electric motor provided with a plurality of phase windings, a source of direct current, means for energizing said machine from said source comprising an electric valve associated with each phase of said motor, a commutating capacitor, each terminal of said capacitor being connected to the valves associated with alternate phases of said motor, a reactor provided with an electrical midpoint connected to said source, and a variable impedance interconnecting each terminal of said capacitor with a terminal of said reactor.

7. The method of starting an alternating current motor energized with direct current impulses directly from a source of direct current of substantially constant voltage through a plurality of electric valves which comprises successively introducing an auxiliary potential between adjacent valves for commutating the current therebetween.

8. The method of starting an alternating current motor energized from a source of direct current through a plurality of electric valves which comprises successively introducing an auxiliary potential between adjacent valves for commutating the current therebetween and reducing the magnitude of said auxiliary potential and simultaneously increasing the potential applied to the motor terminals as the motor increases in speed.

9. The method of operating an alternating current motor of the synchronous type energized from a source of direct current of substantially constant voltage through a plurality of electric valves which comprises successively introducing an auxiliary potential between adjacent valves for commutating the current therebetween under starting conditions and electromagnetically inducing a potential in the motor windings to commutate the current between the valves under normal running conditions.

CLODIUS H. WILLIS.
PHILIP M. CURRIER.